(12) United States Patent
Chakraborty et al.

(10) Patent No.: US 10,810,273 B2
(45) Date of Patent: Oct. 20, 2020

(54) AUTO IDENTIFICATION AND MAPPING OF FUNCTIONAL ATTRIBUTES FROM VISUAL REPRESENTATION

(71) Applicant: Bank of America Corporation, Charlotte, NC (US)

(72) Inventors: Pinak Chakraborty, Hyderabad (IN); Gaurav Bansal, Hyderabad (IN); Nipun Mahajan, Haryana (IN); Yogesh Raghuvanshi, Princeton, NJ (US)

(73) Assignee: Bank of America Corporation, Charlotte, NC (US)

( * ) Notice: Subject to any disclaimer, the term of this patent is extended or adjusted under 35 U.S.C. 154(b) by 573 days.

(21) Appl. No.: 15/621,349

(22) Filed: Jun. 13, 2017

(65) Prior Publication Data
US 2018/0357324 A1  Dec. 13, 2018

(51) Int. Cl.
| | | |
|---|---|---|
| *G06F 16/00* | (2019.01) | |
| *G06F 16/9535* | (2019.01) | |
| *G06F 3/0489* | (2013.01) | |
| *G06F 16/955* | (2019.01) | |
| *G06F 40/14* | (2020.01) | |
| *G06F 40/30* | (2020.01) | |
| *G06F 40/289* | (2020.01) | |

(52) U.S. Cl.
CPC ...... *G06F 16/9535* (2019.01); *G06F 3/04895* (2013.01); *G06F 16/955* (2019.01); *G06F 40/14* (2020.01); *G06F 40/289* (2020.01); *G06F 40/30* (2020.01)

(58) Field of Classification Search
CPC combination set(s) only.
See application file for complete search history.

(56) References Cited

U.S. PATENT DOCUMENTS

| | | |
|---|---|---|
| 5,884,302 A | 3/1999 | Ho |
| 7,027,974 B1 | 4/2006 | Busch et al. |
| 7,487,095 B2 | 2/2009 | Hill et al. |

(Continued)

OTHER PUBLICATIONS

Nahrstedt, et al., "Resource Management in Networked Multimedia Systems," University of Pennsylvania ScholarlyCommons, May, 1994, 47 pages.

(Continued)

*Primary Examiner* — Farhan M Syed
(74) *Attorney, Agent, or Firm* — Banner & Witcoff, Ltd.; Michael A. Springs

(57) ABSTRACT

Aspects of the disclosure relate to computing systems for receiving user requests through channels of a webpage and performing computational functions corresponding to the user requests. In one embodiment, a computing platform may detect a change corresponding to input parameters for performing a user request through a first representation of a webpage. The computing platform may update, based on the detected change corresponding to the input parameters, a natural language processing application associated with a second representation of the webpage. The computing platform may generate, based on the updated natural language processing application associated with the second representation of the webpage, a logical table including one or more questions to ask a user through the second representation of the webpage in response to one or more user inputs.

17 Claims, 13 Drawing Sheets

(56) References Cited

U.S. PATENT DOCUMENTS

| | | | |
|---|---|---|---|
| 8,000,973 B2 | 8/2011 | Williams et al. | |
| 8,005,842 B1 | 8/2011 | Pasca et al. | |
| 8,224,794 B2 * | 7/2012 | Rappaport | G06F 15/177 707/694 |
| 8,489,546 B2 * | 7/2013 | Rappaport | G06Q 30/02 707/609 |
| 8,515,925 B2 * | 8/2013 | Rappaport | G06F 17/00 707/694 |
| 8,538,744 B2 | 9/2013 | Roberts et al. | |
| 8,572,117 B2 * | 10/2013 | Rappaport | G06F 15/177 707/776 |
| 8,725,700 B2 * | 5/2014 | Rappaport | G06F 16/22 707/688 |
| 9,015,730 B1 | 4/2015 | Allen et al. | |
| 9,442,700 B2 | 9/2016 | Sarid | |
| 9,535,898 B2 | 1/2017 | Baughman et al. | |
| 9,668,133 B2 | 5/2017 | Kennedy | |
| 9,668,204 B2 | 5/2017 | Rabii et al. | |
| 9,668,298 B1 | 5/2017 | Pearl et al. | |
| 9,668,647 B2 | 6/2017 | Grenon et al. | |
| 9,668,694 B2 | 6/2017 | Badower | |
| 9,669,161 B2 | 6/2017 | Bryant, Jr. et al. | |
| 9,669,162 B2 | 6/2017 | Sloan et al. | |
| 9,669,259 B1 | 6/2017 | Chuang | |
| 9,669,306 B2 | 6/2017 | Perlman | |
| 9,669,307 B2 | 6/2017 | Perlman et al. | |
| 9,669,699 B2 | 6/2017 | Biderman et al. | |
| 9,669,700 B2 | 6/2017 | Biderman et al. | |
| 9,671,851 B2 | 6/2017 | Luna et al. | |
| 9,672,213 B2 | 6/2017 | Brown et al. | |
| 9,672,260 B2 | 6/2017 | Logue et al. | |
| 9,672,427 B2 | 6/2017 | Laska et al. | |
| 9,672,618 B1 | 6/2017 | Hassanain et al. | |
| 9,672,690 B2 | 6/2017 | Amone et al. | |
| 9,672,698 B2 | 6/2017 | Amone et al. | |
| 9,672,795 B2 | 6/2017 | Goins et al. | |
| 9,672,823 B2 | 6/2017 | Penilla et al. | |
| 9,672,865 B2 | 6/2017 | Fundament et al. | |
| 9,673,717 B2 | 6/2017 | Freeman et al. | |
| 9,674,027 B2 | 6/2017 | Hong et al. | |
| 9,674,113 B2 | 6/2017 | Yousefi et al. | |
| 9,674,122 B2 | 6/2017 | Katis et al. | |
| 9,674,159 B2 | 6/2017 | Sun et al. | |
| 9,674,168 B2 | 6/2017 | Kottahachchi et al. | |
| 9,674,170 B2 | 6/2017 | Roth et al. | |
| 9,674,224 B2 | 6/2017 | Apsangi et al. | |
| 9,674,243 B2 | 6/2017 | Bader-Natal et al. | |
| 9,674,244 B2 | 6/2017 | Katzman et al. | |
| 9,674,255 B1 | 6/2017 | Tiwary et al. | |
| 9,674,271 B2 | 6/2017 | Zhang et al. | |
| 9,674,290 B1 | 6/2017 | Rincon et al. | |
| 9,674,339 B2 | 6/2017 | Bennett | |
| 9,674,340 B1 | 6/2017 | Hodge | |
| 9,674,435 B1 | 6/2017 | Monari et al. | |
| 9,674,499 B2 | 6/2017 | Wang et al. | |
| 9,674,560 B1 | 6/2017 | Harvey et al. | |
| 9,674,563 B2 | 6/2017 | Wheatley | |
| 9,674,586 B2 | 6/2017 | Gordon et al. | |
| 9,674,587 B2 | 6/2017 | Triplett et al. | |
| 9,674,638 B2 | 6/2017 | Angiolillo et al. | |
| 9,674,675 B2 | 6/2017 | Lindner et al. | |
| 9,674,682 B2 | 6/2017 | Miskiewicz et al. | |
| 9,674,707 B2 | 6/2017 | Boettcher et al. | |
| 9,674,756 B2 | 6/2017 | Pandit | |
| 9,674,759 B2 | 6/2017 | Czaja et al. | |
| 9,674,819 B2 | 6/2017 | Sadasivam et al. | |
| 2009/0070379 A1 * | 3/2009 | Rappaport | G06Q 30/06 |
| 2009/0228264 A1 * | 9/2009 | Williams | H04M 3/493 704/9 |
| 2010/0250268 A1 * | 9/2010 | Rappaport | G06F 15/16 705/1.1 |
| 2010/0250269 A1 * | 9/2010 | Rappaport | G06F 16/00 705/1.1 |
| 2010/0299274 A1 * | 11/2010 | Rappaport | G06F 17/00 705/313 |
| 2012/0244835 A1 * | 9/2012 | Rappaport | H04W 4/00 455/406 |
| 2012/0246142 A1 * | 9/2012 | Rappaport | G06F 15/16 707/710 |
| 2016/0029145 A1 * | 1/2016 | Angiolillo | G06Q 30/0203 455/418 |
| 2016/0353240 A1 * | 12/2016 | Rappaport | H04W 4/00 |

OTHER PUBLICATIONS

Lo, et al, "Fusing Visual and Audio Information in a Distributed Intelligent Surveillance System for Public Transport Systems," Acta Automatica Sinica, 29(3), pp. 393-407.

Benoit, et al, "Audio-visual and multimodal Speech Systems," retrieved from https://www.researchgate.net/publication/2279213_Audio-visual_and_Multimodal_Speech_Systems, 95 pages.

Huang, et al., "Multimedia Search and Retrieval: New Concepts, Sustem Implementation and Application," IEEE Transactions on Circuits and Systems for Video Technology, vol. 10, No. 5, Aug. 2000, 14 pages.

Berra, P. Bet al, "An Architecture for distributed multimedia database systems" (1990). Electrical Engineering and Computer Science. Paper 28, retrieved from <http://surface.syr.edu/eecs/28>, 44 pages.

* cited by examiner

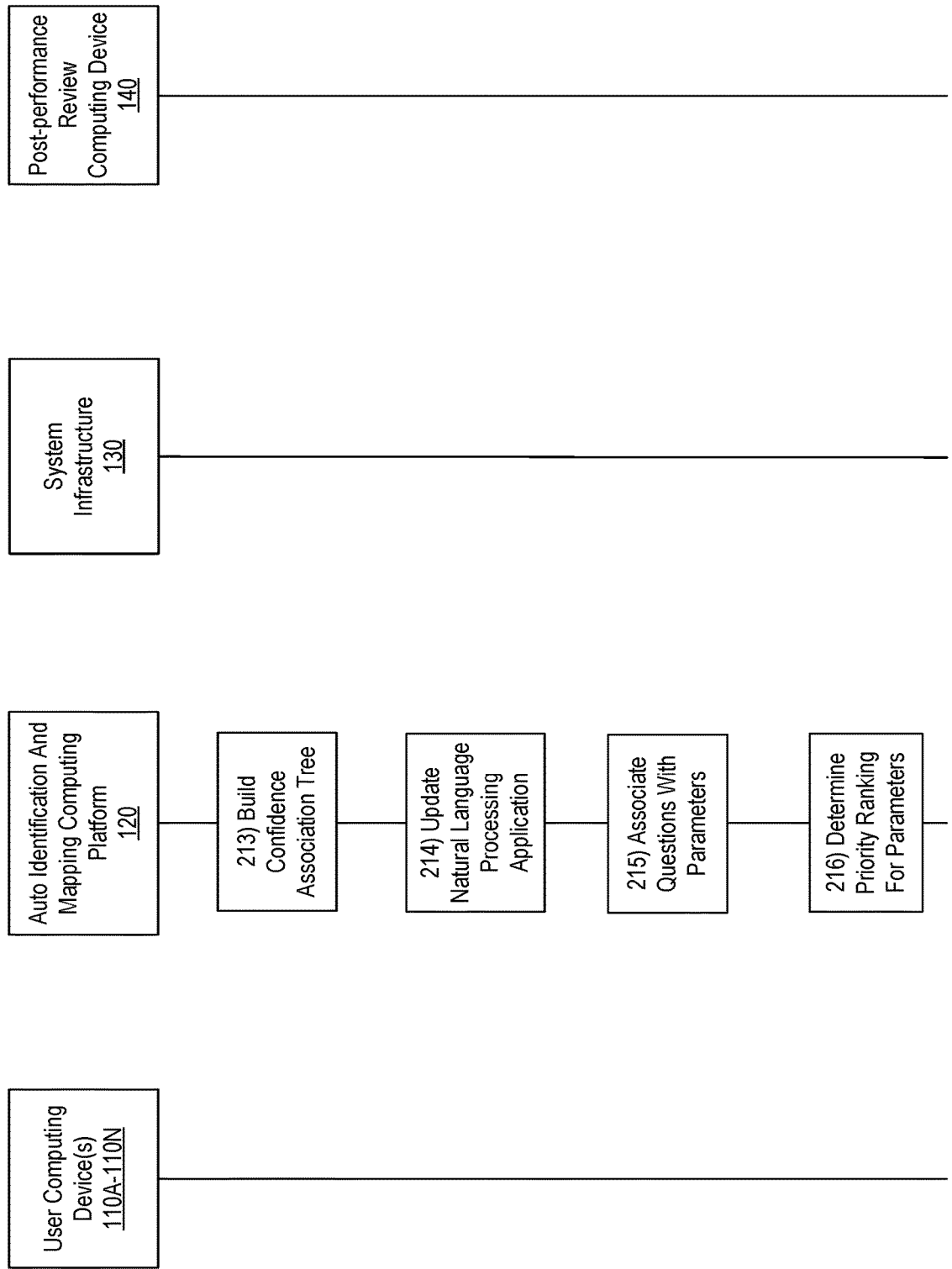

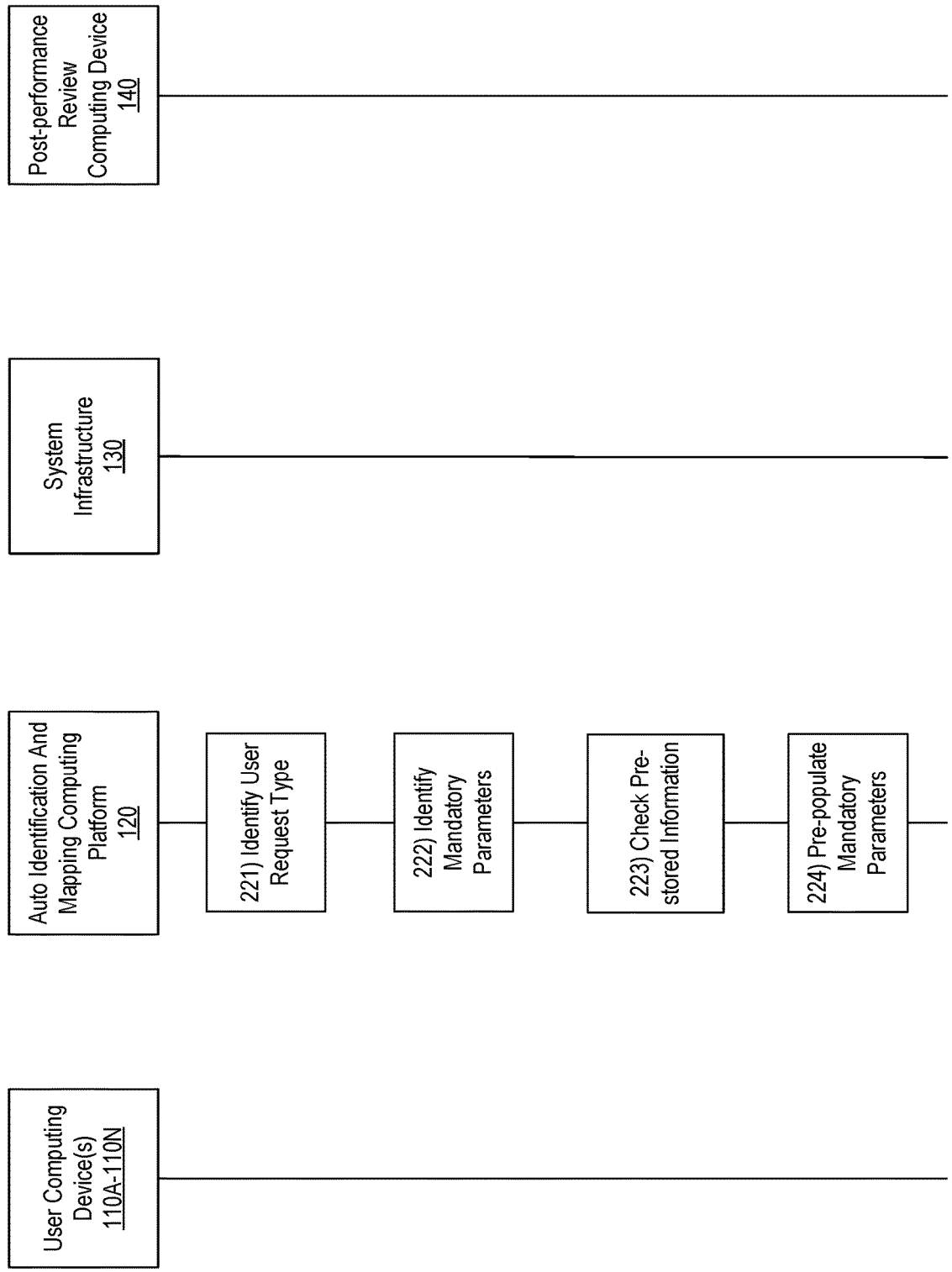

AUTO IDENTIFICATION AND MAPPING OF FUNCTIONAL ATTRIBUTES FROM VISUAL REPRESENTATION

FIELD

Aspects of the disclosure relate to computing systems for the synchronization of multiple channels of a webpage. In particular, one or more aspects of the disclosure relate to the synchronization of multiple channels of a webpage through the autonomous identification and mapping of functional parameters from a first representation to a second representation.

BACKGROUND

In organizational constructs, computing systems are configured to receive user requests and perform computational functions in order to fulfill the user requests. To initiate the user requests and subsequently perform the associated computational functions, users are prompted by the computing system to provide inputs to a number of parameters corresponding to the request type through a particular channel (e.g., an audio channel, a visual channel, and the like). As more granular or feature-rich computational functionalities are built in relation to the request type, the parameters required to be provided by the user in order to perform the request may also change. However, additions and/or subtractions to the computational functionality underlying requests and the corresponding additions and/or subtractions to the required parameters necessary for performing the requests may cause technological disruptions across channels. For example, in instances in which computational functionality associated with a request is changed and the required parameters are updated, the parameter updates may only be manifested in a particular channel (e.g., a visual channel). As such, in computing systems comprising a plurality of interrelated channels, updates to parameters in a particular channel, such as the visual channel where attributes are visually rendered, may disrupt the ability by the computing system to perform the user requests through the audio channel. Namely, the parameter changes associated with request made in the visual channel may cause databases, speech interpretation modules, speech production modules, and user interaction decision trees associated with an audio channel to become outdated. If left unresolved, such parameter changes necessary to perform a particular request type in the visual channel may cause serious computing inefficiencies and/or failures in performing the particular request type through the audio channel.

SUMMARY

Aspects of the disclosure address these and/or other technological shortcomings by providing a computing platform for auto identification and mapping of functional attributes from a visual representation. In particular, one or more aspects of the disclosure provide effective, efficient, scalable, and convenient technical solutions that address and overcome the technical problems associated with updating computational functionality associated with a particular request type on a particular channel (e.g., a particular representation) of a webpage.

In accordance with one or more embodiments, a computing platform having at least one processor and memory, may detect a change corresponding to input parameters for performing a user request through a first representation of a webpage. The computing platform may update, based on the detected change corresponding to the input parameters, a natural language processing application associated with a second representation of the webpage. The computing platform may generate, based on the updated natural language processing application associated with the second representation of the webpage, a logical table including one or more questions for prompting a user to prove one or more answers for the input parameters through the second representation of the webpage. The computing platform may receive, through the second representation of the webpage, a first user input corresponding to the user request. Responsive to receiving the first user input, the computing platform may prompt the user with the one or more questions regarding the input parameters for the user request. Responsive to prompting the user with the one or more questions, the computing platform may receive at least a second user input including the one or more answers for the input parameters and, in response to receiving at least the second user input including the one or more answers, may execute the user request with the one or more answers for the input parameters.

In some embodiments, the computing platform may parse a page document corresponding to the first representation of the webpage to generate a document object model (DOM) of the page document including the one or more tag sequences. The computing platform may isolate each of the one or more tag sequences related to user input fields for performing the user request and extract, from each of the one or more isolated tag sequences, information corresponding to the input parameters and associated attributes of each of the user input fields. Based on the extracted information, the computing platform may assign a type attribute to each of the input parameters, the type attribute indicating whether the corresponding input parameter is mandatory or optional.

In some embodiments, the computing platform may be further configured to isolate the historical conversation logs corresponding to the user request. The computing platform may parse the isolated historical conversation logs corresponding to the user request to produce a part-of-speech (POS) tagged sentence for each of the historical conversation logs. The computing platform may generate a mapping of the input parameters and associated attributes with the POS tagged sentence for each of the historical conversation logs and build, based on the mapping, a confidence association of the input parameters and associated attributes with the POS tagged sentence for each of the historical conversation logs. The computing platform may update, based on the mapping and the confidence association, the natural language processing application associated with the second representation of the webpage.

In some embodiments, the computing platform may be further configured to associate, based on the mapping of the input parameters and associated attributes with the POS tagged sentence for each of the historical conversation logs, each of the input parameters corresponding to the user request with a particular question of the plurality of questions. The computing platform may determine a priority ranking for each of the input parameters corresponding to the user request based on an average position of the input parameters in the POS tagged sentence in each of the historical conversation logs and may order the plurality of questions based on the priority ranking for each of the input parameters.

In some embodiments, the computing device may be further configured to receive, through the second representation of the webpage, a first user input corresponding to the user request and parse the first user input to produce a POS tagged sentence for the first user input. The computing device may identify, based on the POS tagged sentence for the first user input, input parameters that the user has provided information for, determine the input parameters that the user has not provided information for, and identify the priority ranking for each of the input parameters that the user has not provided information for. Based on the priority ranking for each of the input parameters, the computing platform may prompt the user to provide a second user input, wherein the prompt includes the question corresponding to the input parameter with a highest priority ranking and may receive, through the second representation of the webpage, the second user input. The computing platform may identify that the user has provided information for each of the input parameters corresponding to the user request and may perform the user request.

These features, along with many others, are discussed in greater detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein:

FIGS. 2A, 2B, 2C, 2D, 2E, 2F, 2G, 2H, 2I, and 2J depict an illustrative event sequence for auto identification and mapping of functional attributes from a visual representation in accordance with one or more example embodiments;

DETAILED DESCRIPTION

In the following description of the various embodiments, reference is made to the accompanying drawings, which form a part hereof, and in which is shown by way of illustration various embodiments in which aspects described herein may be practiced. It is to be understood that other embodiments may be utilized and structural and functional modifications may be made without departing from the scope of the described aspects and embodiments. Aspects described herein are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Figure 1A:
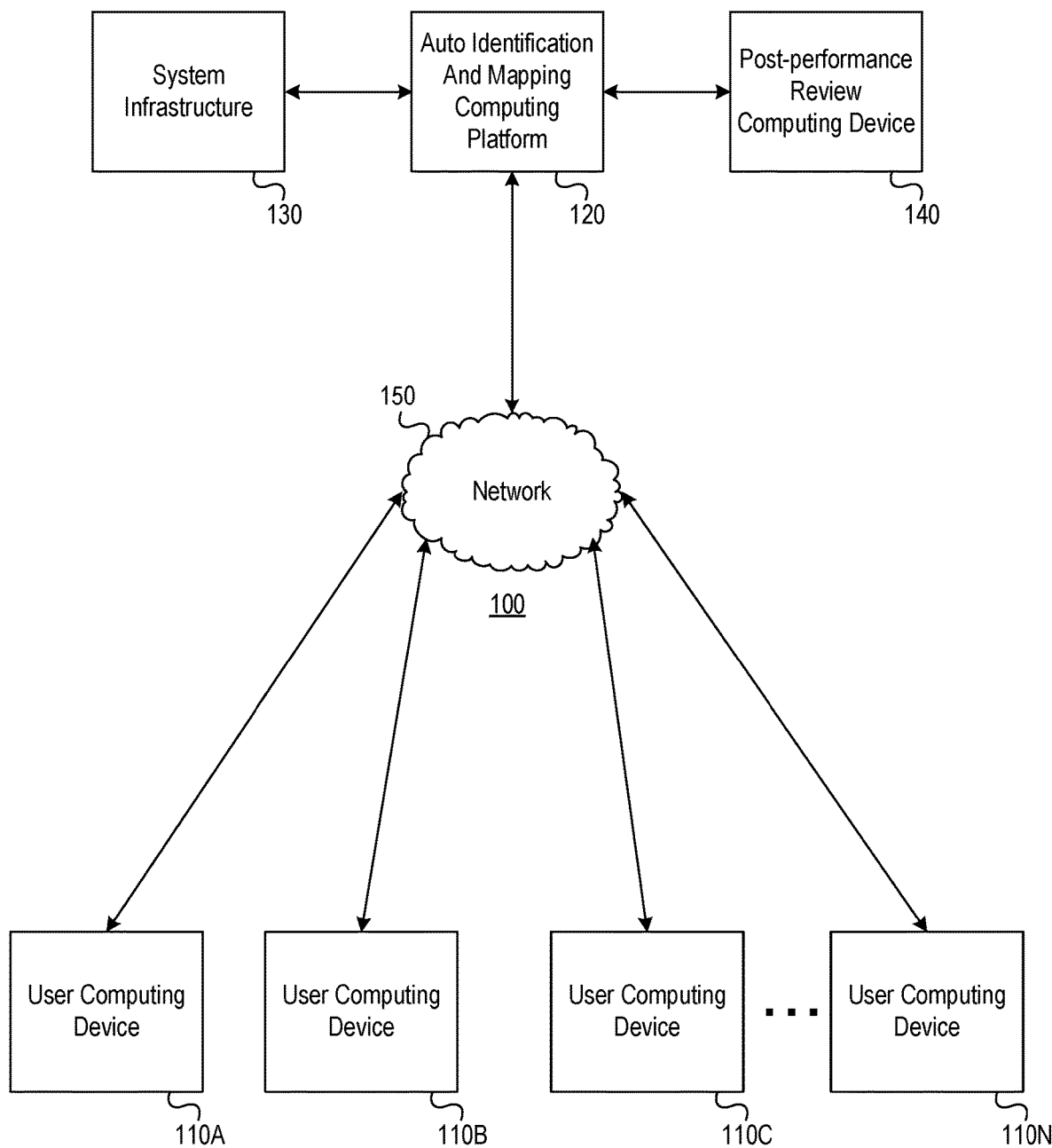
FIGS. 1A and 1B depict an illustrative computing environment for auto identification and mapping of functional attributes from a visual representation in accordance with one or more example embodiments.
Figure 1B:
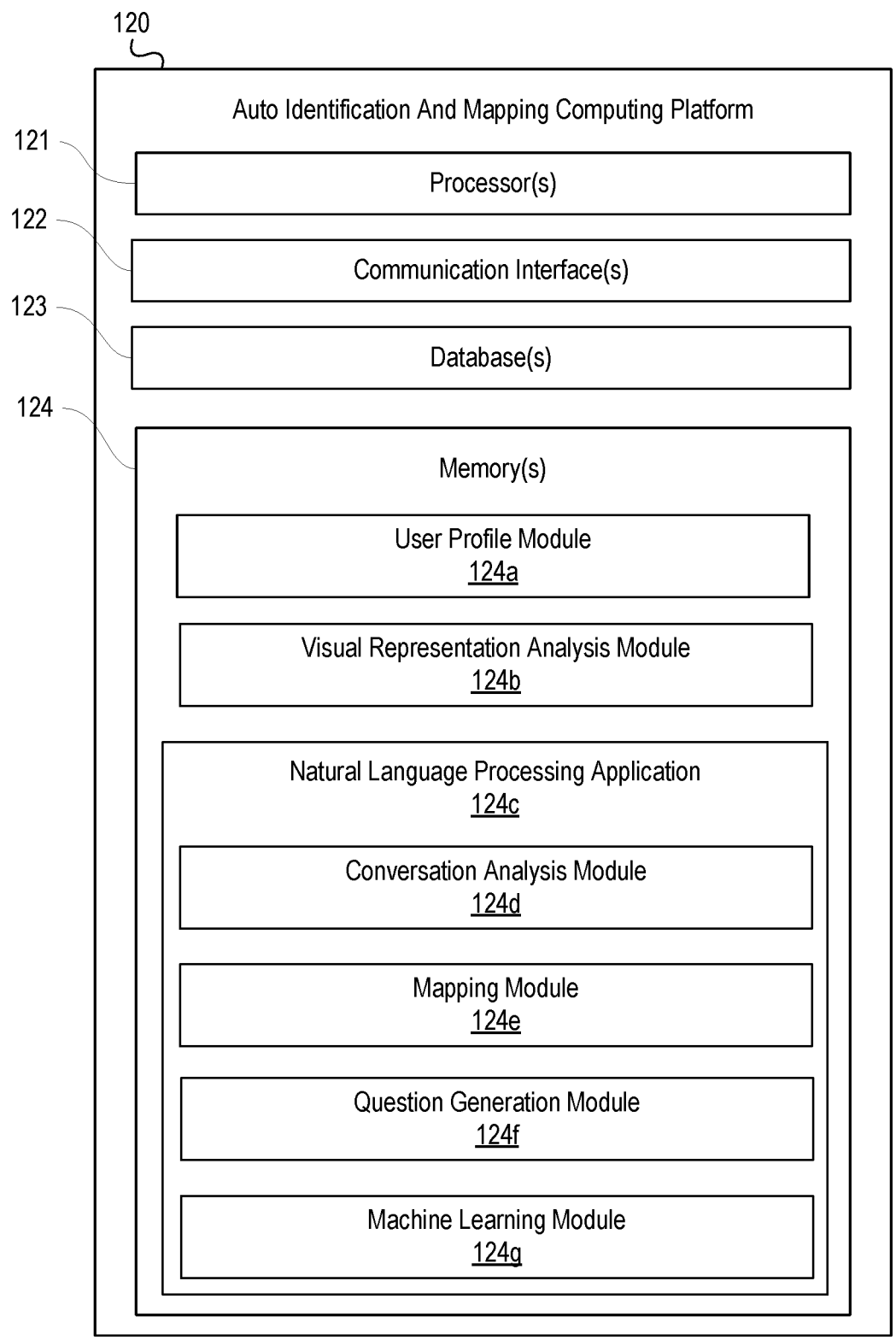

FIGS. 1A and 1B depict an illustrative computing environment for an auto identification and mapping system for performing auto identification and mapping of functional attributes from a visual representation in accordance with one or more example embodiments.

Referring to FIG. 1A, computing environment 100 may include one or more computing devices and/or other computer systems. For example, computing environment 100 may include one or more user computing devices 110A-110N, auto identification and mapping computing platform 120, system infrastructure 130, and post-performance review computing device 140. Each of the one or more user computing devices 110A-110N, auto identification and mapping computing platform 120, system infrastructure 130, and post-performance review computing device 140 may be configured to communicate with each other, as well as with other computing devices, for example, through network 150. In some instances, auto identification and mapping computing platform 120, system infrastructure 130, and post-performance review computing device 140 may be configured to communicate with each other through a local and/or internal network. Such a local and/or internal network may be configured to interface with network 150 and user computing devices 110A-110N.

Each of the user computing devices 110A-110N may be configured to interact with auto identification and mapping computing platform 120 and/or system infrastructure 130 through network 150. In particular, each of the user computing devices 110A-110N may be configured to receive and transmit information corresponding to system requests through particular channels and/or representations of webpages associated with auto identification and mapping computing platform 120 and/or system infrastructure 130. The system requests provided by user computing devices 110A-110N may initiate the performance of particular computational functions such as data and/or file transfers. In some instances, the system requests may be provided by a user through vocal interaction and/or physical interaction with one of user computing devices 110A-110N. As such, user computing devices 110A-110N may include an input/output module such as a microphone, keypad, touch screen, and/or stylus through which a user of the may provide input, and may also include one or more of a speaker for providing audio input/output and a video display device for providing textual, audiovisual and/or graphical output.

As will be described in further detail below, to perform the system requests provided by user computing devices 110A-110N, the auto identification and mapping computing platform 120 and/or system infrastructure 130 may require data corresponding to specific parameters associated with the system requests. In regard to data and/or file transfer requests, such parameters may include 'from account' information, 'to account' information, 'data and/or file for transfer' information, and 'date of transfer' information. These parameters may be denoted as being mandatory parameters because of their necessity in performing the data and/or file transfer requests. Additional parameters may be included in the data and/or file transfer requests such as memos and/or notes for the sender and/or receiver of the data and/or file. The additional parameters may be denoted as optional parameters as their inclusion is not required for performing the system request.

Furthermore, each of the parameters, whether mandatory or optional, may be associated with particular attributes that define the data type (e.g., numeric, alphanumeric, data/time, and text), maximum length (e.g., maximum number of characters), mandatory or optional Boolean flag, and default and/or assumed values that, in some cases, may be overwritten by the users while invoking the requested function. Data types may also be custom build data types such as account, customer identification, data and/or file, and data and/or file type. In some instances, the data types may have a directional attribute (e.g., from, to, neutral) to indicate a direction of information of transmission.

In order to invoke a computational function associated with a system request, a user of one of user computing devices 110A-110N may be required to provide the input parameters required by the auto identification and mapping computing platform 120 and/or system infrastructure 130 to perform the function. In some instances, the system requests and corresponding input parameters may be provided through at least visual channels and/or representations, and/or audio channels (e.g., voice-based channels). In some instances, channel may be synonymous with representation. As will be described in further detail below, in some arrangements, visual channels may be a the communicative interface through which a user may provide requests tot server infrastructure 130, whereas voice-based channels may the communicative interface through which a user may provide requests to auto identification and mapping computing platform 120. Alternatively, in other arrangements, visual channels and voice-based channels may be provided by and/or otherwise associated with auto identification and mapping computing platform 120, server infrastructure 130, or both auto identification and mapping computing platform 120 and server infrastructure 130.

For visual channels and/or representations, a computing device such as auto identification and mapping computing platform 120 and/or server infrastructure 130 may render a hypertext markup language (HTML) page to a web browser or a graphical user interface (GUI) of an application associated with one of user computing devices 110A-110N over network 150. The rendering of the HTML page of the web browser or the GUI of the application may include a fillable form corresponding to a user request with the associated input parameters of the request. The user of the particular user computing device from user devices 110A-110N may provide inputs to the parameters of the fillable form corresponding to the request and submit the entered data back to auto identification and mapping computing platform 120 and/or server infrastructure 130 for execution of the function.

For audio channels and/or representations, a computing device such as auto identification and mapping computing platform 120 and/or server infrastructure 130 may audibly prompt a user of one of user computing devices 110A-110N to verbally provide the input parameters required to perform a system request. In order to prompt the user in this way through voice-based channels, auto identification and mapping computing platform 120 and/or server infrastructure 130 may generate and output a series of questions to ask the user of one of user computing devices 110A-110N to audibly provide the input parameters required to perform the system request.

Referring back to FIG. 1A, computing environment 100 may include auto identification and mapping computing platform 120, which may include a plurality of computing devices and associated computing hardware and software that may host various applications configured to receive, transmit, and/or store data, control and/or direct actions of other devices and/or computer systems (e.g., user computing device 110A-110N, server infrastructure 130, and post-performance review computing device 140), and/or perform other functions, as discussed in greater detail below. In some arrangements, auto identification and mapping computing platform 120 may include and/or be part of enterprise information technology infrastructure and may host a plurality of enterprise applications, enterprise databases, and/or other enterprise resources. Such applications may, for instance, be executed on one or more computing devices included in auto identification and mapping computing platform 120 using distributed computing technology and/or the like. In some instances, auto identification and mapping computing platform 120 may include a relatively large number of servers that may support operations of a particular enterprise or organization, such as a financial institution. In addition, and as discussed in greater detail below, various computing devices included in auto identification and mapping computing platform 120 may be configured to communicate with and/or otherwise interface with user computing devices 110A-110N, server infrastructure 130, and/or post-performance review computing device 140.

As discussed above, auto identification and mapping computing platform 120 may be configured to receive input parameters corresponding to user requests from user computing devices 110A-110N. Such input parameters corresponding to the user requests may, in some instances, be received and processed through at least visual channels and audio channels. In other instances, the input parameters corresponding to the user requests may be received and processed through only audio channels. In both types of instances, when additions and/or subtractions are made to the computational functionality that underlies various requests and when corresponding additions and/or subtractions are made to the required parameters necessary for performing the requests in the visual channel, auto identification and mapping computing platform 120 may be configured to detect the changes to the visual channel and update the audio channel based on the detected changes to the visual channel. Furthermore, auto identification and mapping computing platform 120 may be configured to generate a plurality of questions to ask a user of one of user computing devices 110A-110N based on the updates to the visual channel in order to elicit responses from the user corresponding to the required parameters necessary for performing the request in the audio channel. In some instances, the generation of the plurality of questions and/or the elicitation of the required parameters via the plurality of questions may be performed by auto identification and mapping computing platform 120 executing natural language processing and/or machine learning algorithms.

Auto identification and mapping computing platform 120 may be configured to perform the computational functions corresponding to the user request through the audio channel and provide conversation logs of the user request through the audio channel to post-performance review computing device 140. Based on input provided by a user of post-performance review computing device 140, auto identification and mapping computing platform 120 may be configured to update the natural language processing and/or machine learning algorithms to improve performance of the generation of the plurality of questions and/or the elicitation of the required parameters via the plurality of questions.

Server infrastructure 130 may be configured to interact with user computing devices 110A-110N, auto identification and mapping computing platform 120, and post-performance review computing device 140 through network 150. In some instances, server infrastructure 130 may be able to communicate with auto identification and mapping computing platform 120 and post-performance review computing device 140 through a local network connecting server infrastructure 130, auto identification and mapping computing platform 120, and post-performance review computing device 140. The local network may be configured to interface with network 150 and enable communication with user computing devices 110A-110N.

In particular, server infrastructure 130 may be configured to receive input parameters corresponding to user requests from user computing devices 110A-110N. Such input parameters corresponding to the user requests may be received and processed through at least visual channels and/or audio channels. In instances in which server infrastructure 130 is configured to receive user requests through visual channels, server infrastructure 130 may be configured to interact with auto identification and mapping computing platform 120 in regard to changes made to the visual channels. For example, in the event that additions and/or subtractions to the computational functionality that underlies requests in the visual channel and corresponding additions and/or subtractions to the required parameters necessary for performing the requests occur, server infrastructure 130 may be configured to communicate information to auto identification and mapping computing platform regarding such changes.

Post-performance review computing device 140 may be configured to interact with auto identification and mapping computing platform 120 and/or system infrastructure 130 through network 150 and/or a local network to which auto identification and mapping computing platform 120 and/or system infrastructure 130 are connected. In particular, post-performance review computing device 140 may be configured to receive information from auto identification and mapping computing platform 120 and/or system infrastructure 130 related to the generation of the plurality of questions and/or the elicitation of the required parameters via the plurality of questions presented by natural language processing and/or machine learning algorithms. At post-performance review computing device 140, a system administrator may be able to review the information related to the generation of the plurality of questions and/or the elicitation of the required parameters via the plurality of questions presented by natural language processing and/or machine learning algorithms and provide feedback. Such feedback may be utilized to update the natural language processing and/or machine learning algorithms and improve performance.

While denoted as being separate entities in FIG. 1A, auto identification and mapping computing platform 120, system infrastructure 130, and/or post-performance review computing device 140 may be combined into a single computing device, platform, and/or server. In some instances, auto identification and mapping computing platform 120, system infrastructure 130, and/or post-performance review computing device 140 may be virtual machines operating on one or more computing devices capable of providing for virtualization.

One or more user computing devices 110A-110N, auto identification and mapping computing platform 120, system infrastructure 130, and/or post-performance review computing device 140 may be any type of computing device capable of receiving a user interface, receiving input via the user interface, and communicating the received input to one or more other computing devices. For example, one or more user computing devices 110A-110N, auto identification and mapping computing platform 120, system infrastructure 130, and/or post-performance review computing device 140 may, in some instances, be and/or include server computers, desktop computers, laptop computers, tablet computers, smart phones, or the like that may include one or more processors, memories, communication interfaces, storage devices, and/or other components (e.g., databases). As noted above, and as illustrated in greater detail below, any and/or all of the one or more user computing devices 110A-110N, auto identification and mapping computing platform 120, system infrastructure 130, and/or post-performance review computing device 140 may, in some instances, be special-purpose computing devices configured to perform specific functions.

As stated above, computing environment 100 also may include one or more networks, which may interconnect one or more of the one or more user computing devices 110A-110N, auto identification and mapping computing platform 120, system infrastructure 130, and/or post-performance review computing device 140. For example, computing environment 100 may include network 150. Network 150 may include one or more sub-networks (e.g., local area networks (LANs), wide area networks (WANs), or the like). Furthermore, computing environment 100 may include a local network configured to connect auto identification and mapping computing platform 120, system infrastructure 130, and/or post-performance review computing device 140. The local network connecting auto identification and mapping computing platform 120, system infrastructure 130, and/or post-performance review computing device 140 may interface with network 150 and enable communication with user computing devices 110A-110N.

Referring to FIG. 1B, and in further detail in regard to auto identification and mapping computing platform 120, auto identification and mapping computing platform 120 may include processor(s) 121, communication interface(s) 122, database(s) 123, and memory 124. Communication interface(s) 122 may include wired network adapters, wireless network adapters, and/or other networks interfaces configured to support communication between auto identification and mapping computing platform 120 and one or more networks (e.g., network 150). Database(s) 123 may store data related to historical conversation logs through the audio channel, iterations of question generation, analysis of changes to input parameters corresponding to requests in the visual channel, and the like. Memory 124 may include one or more program modules having instructions that, when executed by processor(s) 121, cause auto identification and mapping computing platform 120 to perform auto identification and mapping functions, as well as other functions described herein. For example, memory 124 may have, store, and/or include user profile module 124a, visual representation analysis module 124b, and natural language processing application 124c, which may include conversation analysis module 124d, mapping module 124e, and question generation module 124f, and machine learning module 124g.

User profile module 124a may store information corresponding to a user of user computing device 110 as pertaining to the user's usage of auto identification and mapping computing platform 120, as described in further detail below. In particular, user profile module 124a may store data corresponding to the user's account information and preferences in regard to the manner in which natural language processing application 124c, conversation analysis module 124d, mapping module 124e, and question generation module 124f, and machine learning module 124g perform their respective functions.

Visual representation analysis module 124b may have instructions that facilitate many of the interactions between auto identification and mapping computing platform 120 and the visual channel associated with user requests as described herein. For instance, visual representation analysis module 124b may detect changes corresponding to input parameters for performing a user request through a first representation of a webpage. In particular, visual representation analysis module 124b may parse a page document, PDF document, textual editing document, video file, and/or image file corresponding to a visual representation of a webpage and/or application to generate a document object model (DOM) of the document including one or more tag sequences. Visual representation analysis module 124b may isolate each of the one or more tag sequences related to user input fields (e.g., input parameters) for receiving data required in performing user requests. Visual representation analysis module 124b may be configured to enable auto identification and mapping computing platform 120 to extract information corresponding to the input parameters and associated attributes of each of the user input fields of the visual representation, assign a type attribute to each of the input parameters, and identify metadata for the input parameters.

Natural language processing application 124c may have instructions that direct and/or cause auto identification and mapping computing platform 120 to assess the input parameters and metadata of the user request in the visual channel, generate questions to elicit user input for the parameters, receive audible user requests and inputs, and provide questions responsive to receiving audible user requests and inputs.

For example, natural language processing application 124c may search database(s) 123 to isolate historical conversation logs corresponding to user requests. Through conversation analysis module 124d, natural language processing application 124c may cause auto identification and mapping computing platform 120 to search database(s) 123 to parse the historical conversation logs to produce a part-of-speech (POS) tagged sentence for each of the historical conversation logs.

Mapping module 124e of natural language processing application 124c may generate a mapping of the input parameters and associated attributes with the POS tagged sentence for each of the historical conversation logs, as well as a confidence association tree, through association rule learning, of the input parameters and associated attributes with the POS tagged sentence for each of the historical conversation logs. Based on the mapping and the confidence association tree, the machine learning module 124g may cause the natural language processing application 124c to be updated.

Question generation module 124f of natural language processing application 124c may associate each of the input parameters corresponding to the user request with a particular question of a plurality of questions based on the mapping of the input parameters and associated attributes with the POS tagged sentence for each of the historical conversation logs. Further, question generation module 124f may determine a priority ranking for each of the input parameters corresponding to the user request based on an average position of the input parameters in the POS tagged sentence in each of the historical conversation logs and order the plurality of questions based on the priority ranking for each of the input parameters.

In some instances, auto identification and mapping computing platform 120 may be configured to receive audible user requests and corresponding user inputs through an audio channel. Conversation analysis module 124d of natural language processing application 124c may parse the user requests and corresponding user inputs to produce POS tag sentences for each user input corresponding to the user request. From the POS tagged sentences, conversation analysis module 124d may identify input parameters for which the user has provided information.

Further, conversation analysis module 124d of natural language processing application 124c may identify input parameters required to perform the user request for which the user has not provided inputs. Question generation module 124f may determine a priority ranking for each of the required input parameters for which the user has not provided information and, based on the priority rankings, elicit the user to provide input for the parameters via the question associated with the priority ranking of the parameter. After receiving appropriate user inputs for the required input parameters, the auto identification and mapping computing platform 120 may perform the computational functions relating to the user request.

FIGS. 2A, 2B, 2C, 2D, 2E, 2F, 2G, 2H, 2I, and 2J depict an illustrative event sequence for auto identification and mapping of functional attributes from a visual representation in accordance with one or more example embodiments. To address the above-mentioned technological shortcomings, and in accordance with one or more embodiments of the disclosure, an auto identification and mapping computing system for performing auto identification and mapping of functional attributes from a visual representation.

Figure 2A:
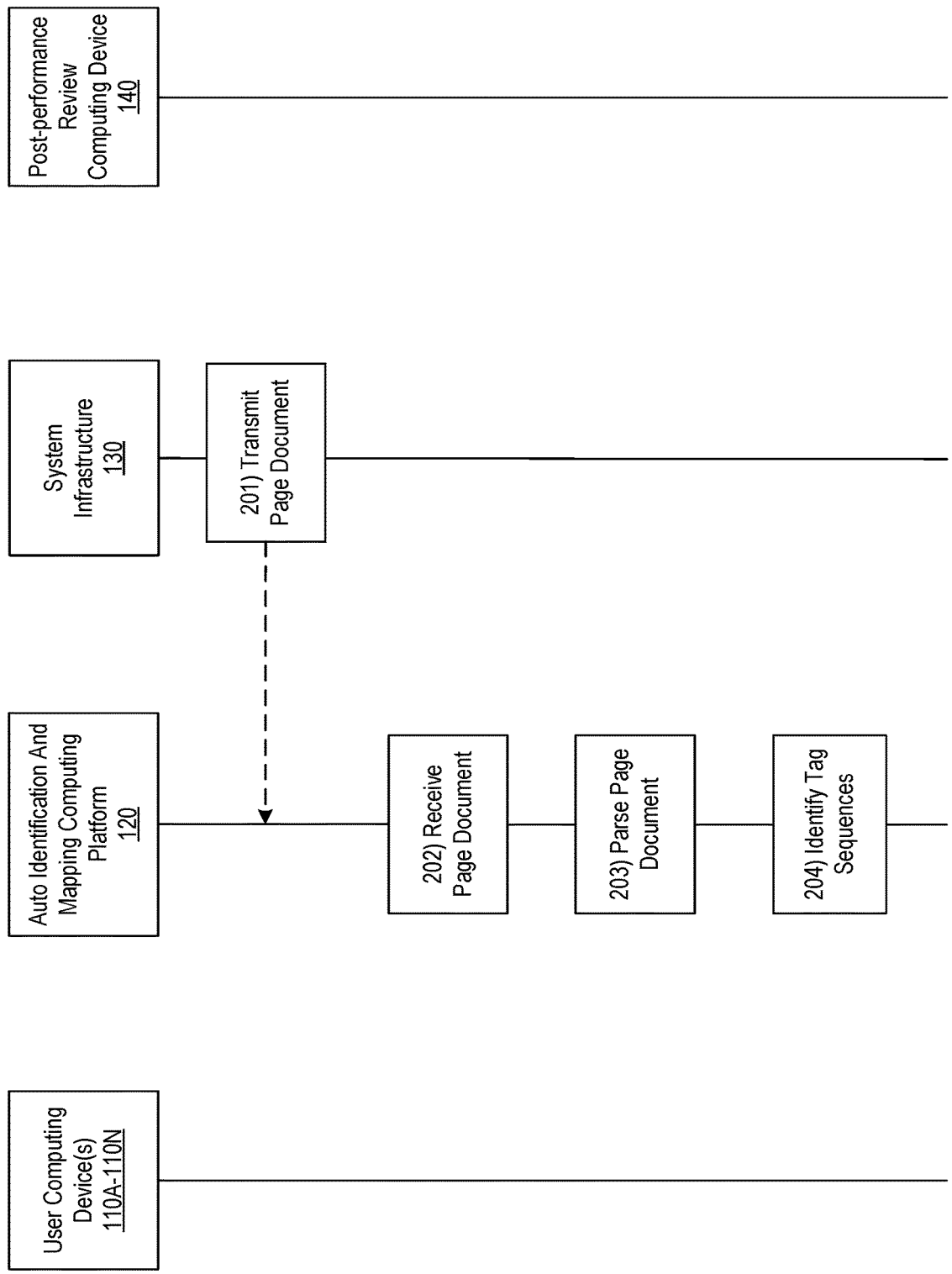

Referring to FIG. 2A, at step 201, system infrastructure 130 may transmit a page document corresponding to the visual representation of a webpage associated with a system request to auto identification and mapping computing platform 120. In some instances, the transmission may be precipitated by a change to the input parameters of the page document corresponding to the visual representation of the webpage. In other instances, the transmission by performed in response to a request by auto identification and mapping computing platform 120.

Additionally and/or alternatively, auto identification and mapping computing platform 120 may be configured to scan the visual representation of a webpage associated with a system request on system infrastructure 130. Such scans may be performed periodically at predetermined time intervals, upon command by a system administrator, in response to changes to the input parameters of the page document corresponding to the visual representation of the webpage, in response to detecting changes to the input parameters of the page document corresponding to the visual representation of the webpage, and so on.

At step 202, auto identification and mapping computing platform 120 may receive the page document data corresponding to the visual representation of the webpage associated with the system request. At step 203, visual representation analysis module 124b of auto identification and mapping computing platform 120 may parse the page document corresponding to the visual representation of the webpage associated with the system request to generate a DOM of the page document. In some instances, the generated DOM will include one or more tag sequences. At step 204, visual representation analysis module 124b may identify each of the one or more tag sequences of the DOM based on a type of tag sequence. For instance, the types of tag sequences may include title, body, header(s), paragraph(s), form(s), input(s), image(s), audio/video(s), link(s), list(s), table(s), style and semantic(s), metadata, script(s), applet(s), and the like.

Figure 2B:
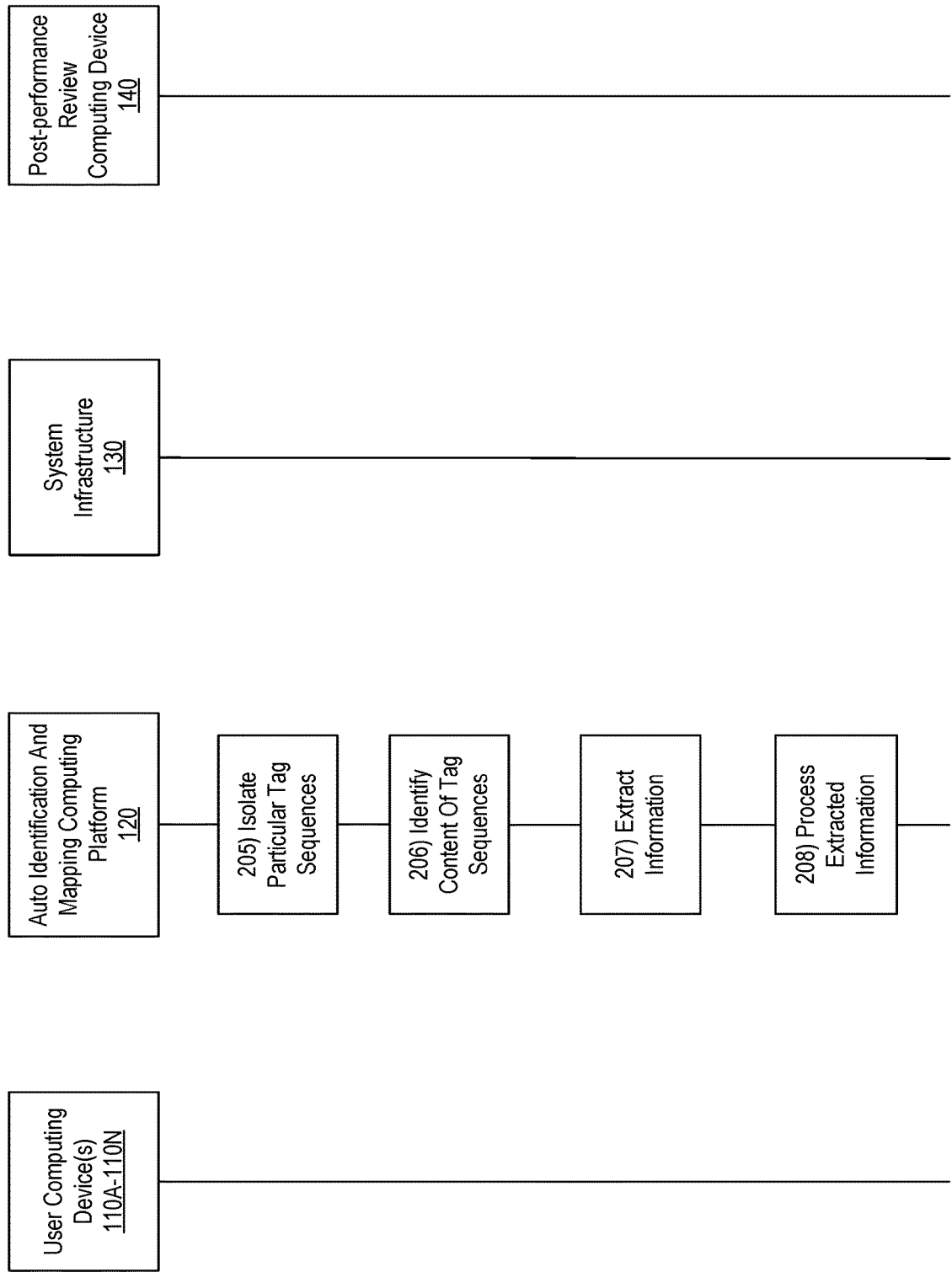

Referring to FIG. 2B, at step 205, the visual representation analysis module 124b of the auto identification and mapping computing platform 120 may isolate certain tag sequences for the totality of identified and/or classified tag sequences based on tag sequence type. In particular, tag sequences corresponding to title, header(s), form(s), and input(s) may be isolated. For example, the totality of identified and/or classified tag sequences may be sorted to identify tag sequences corresponding to title, header(s), form(s), and input(s). At step 206, visual representation analysis module 124b may identify content included between the start tag and end tag of the tag sequences. The identified content may include text, forms, applications, images, and videos, as well as any accompanying metadata. At step 207, visual representation analysis module 124b may extract textual information associated with the identified content of each of the isolated tag sequences corresponding to forms and associated input fields. In some instances, the extraction may be performed through information extraction processes such as natural language processing, name entity recognition, relation extraction, statistical learning approaches, and the like. In particular, visual representation analysis module 124b may extract information corresponding to input parameters and associated attributes of the input fields of the forms. Additionally, the visual representation analysis module 124b may further extract text information associated with the title and/or header tag sequences. At step 208, visual representation analysis module 124b may process the extracted textual information to identify a type of system request (e.g., data and/or file transfer) associated with the page document of the webpage.

Figure 2C:
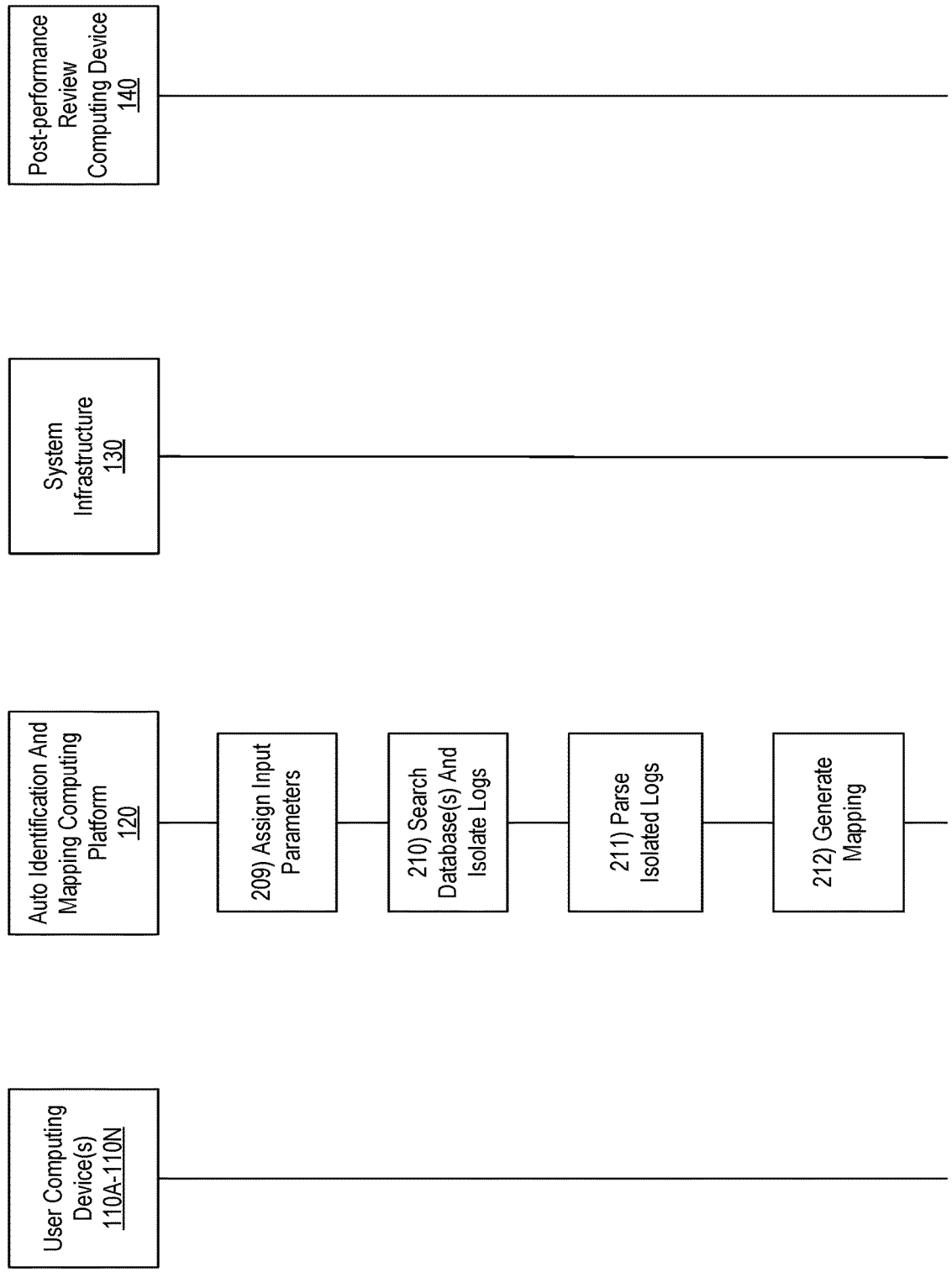

Referring to FIG. 2C, at step 209, visual representation module 124b may assign a type attribute to each of the input parameters indicating whether the corresponding input parameter is mandatory or optional. Further, visual representation module 124b may identify the associated attributes of the input parameters that define the data type (e.g., numeric, alphanumeric, data/time, and text), maximum length (e.g., maximum number of characters), and default and/or assumed values. Data types may also be custom build data types such as account, customer identification, data and/or file, and data and/or file type. In some instances, the data types may have a directional attribute (e.g., from, to, neutral) to indicate a direction of information of transmission.

At step 210, natural language processing application 124c of auto identification and mapping computing platform 120 may search database(s) 123, which stores historical conversation logs, to isolate the historical conversation logs corresponding to the type of system request identified at step 208. At step 211, conversation analysis module 124d of natural language processing application 124c may parse the isolated historical conversation logs corresponding to the system request to produce a part-of-speech (POS) tagged sentence for each of the historical conversation logs. The POS tag sentences may be tagged based on identification of words as being nouns, verbs, adjectives, adverbs, prepositions, and the like, and the relationships between adjacent and related words in the sentence.

At step 212, mapping module 124e of natural language processing application 124c may generate a mapping of the POS tagged sentences for each of the historical conversation logs with the input parameters and associated attributes. In doing so, the mapping may create an association between the input parameters and associated attributes with the identified words of the POS tag sentences. For example, in regard to data and/or file transfer system requests, the input parameter corresponding to the 'from account' may be mapped to identified words of the POS tag sentences such as 'my transfer account,' 'my account,' 'transfer account,' and so on. In some instances, mappings module 124e may utilize machine learning module 124g to generate the mapping of the POS tagged sentences for each of the historical conversation logs with the input parameters and associated attributes. In particular, auto identification and mapping computing platform 120 may utilize deep learning algorithms to generate the mapping.

Referring to FIG. 2D and step 213, mapping module 124e may build a confidence association tree of the input parameters and associated attributes with the POS tagged sentence for each of the historical conversation logs. In some instances, mapping module 124e may use machine learning module 124g to build the confidence association tree of the input parameters and associated attributes with the POS tagged sentence for each of the historical conversation logs. In particular, auto identification and mapping computing platform 120 may utilize association rule learning algorithms may be used to produce the confidence association tree. At step 214, natural language processing application 124c may be updated based on the mapping and the confidence association tree.

At step 215, question generation module 124g of natural language processing application 124c may parse the historical conversation logs stored in database(s) 123 based on the mapping and confidence association tree of the input parameters and associated attributes with the POS tagged sentence to link one or more questions corresponding to each input parameter. The one or more questions may be identified based on each question's ability to elicit the user to provide the corresponding input parameter. In some instances, each of the one or more questions associated with a particular input parameter may be ordered based on their efficacy in eliciting a user to produce a correct response. For example, in regard to an input parameter corresponding to the 'from account,' a question which yields an appropriate response more frequently may be ranked higher than a question that yields the appropriate response less frequently.

At step 216, question generation module 124g may determine a priority ranking for each of the input parameters. In some instances, the priority ranking may serve as an indication of importance of the input parameters, where a lower priority ranking (e.g., 1) indicates a parameter of more importance than a parameter with a higher priority ranking (e.g., 2). Importance may be determined based on the relevance of the input parameter. For example, in regard to a data and/or file transfer request, the input parameter for the 'from account' may be more relevant than the input parameter for 'date of transfer.' Alternatively, the priority ranking may be based on an average position of the input parameters in the POS tagged sentence in each of the historical conversation logs.

Figure 2E:
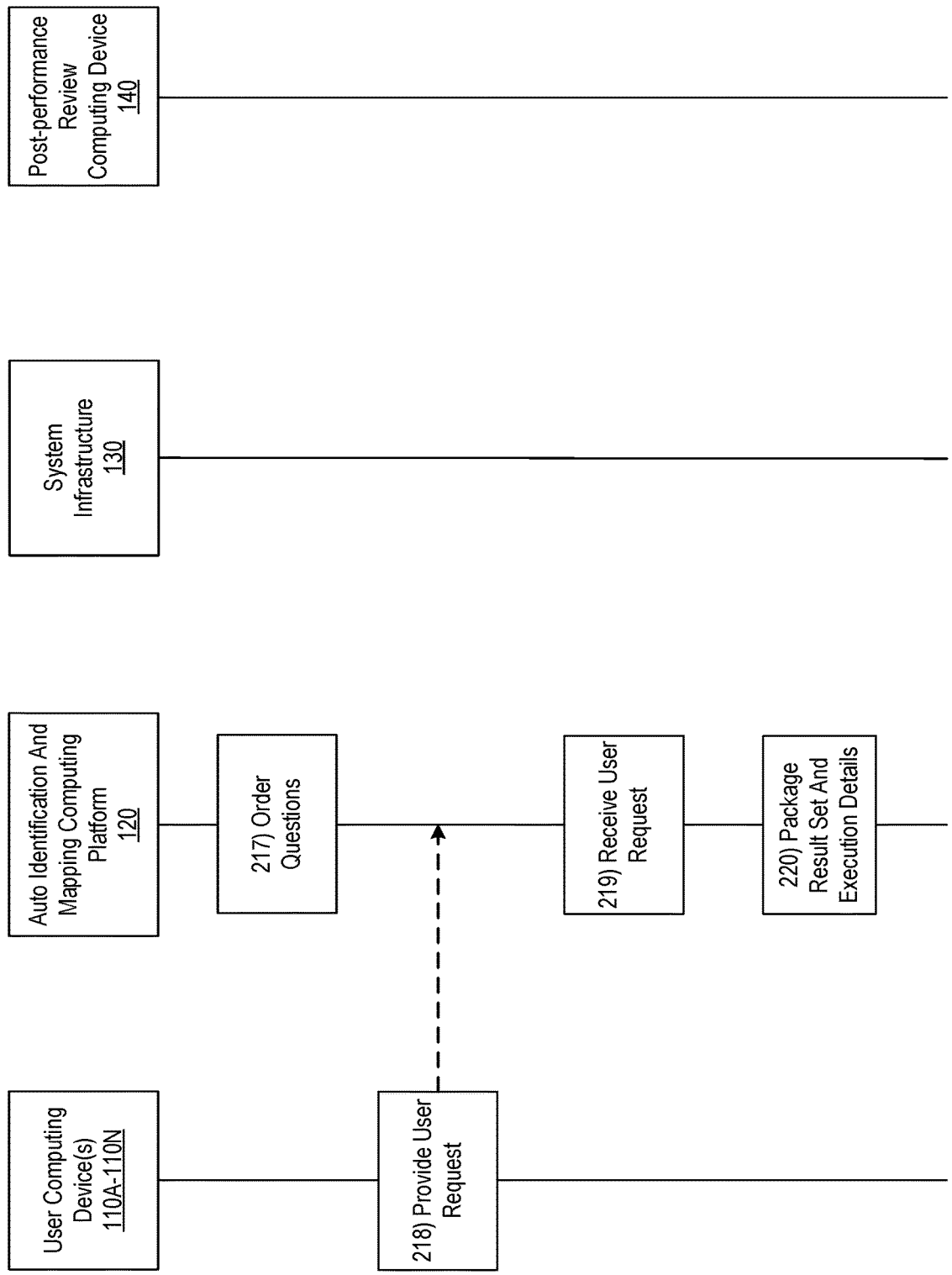

Referring to FIG. 2E at step 217, question generation module 124g may order the questions corresponding to the input parameter each question is intended to elicit from a user based on the priority ranking of each of the input parameters. At step 218, a user of one of user computing devices 110A-110N may provide a user request for performance of a system request to auto identification and mapping computing platform 120 through a speech-based channel and/or representation. At step 219, auto identification and mapping computing platform 120 may receive the user request. At step 220, natural language processing application 124c of auto identification and mapping computing platform 120 may parse the user request to produce a POS tagged sentence for the audible user input corresponding to the user request.

Referring to FIG. 2F, at step 221, natural language processing application 124c, based on the POS tagged sentence of the audible user input, may identify a particular system request (e.g., data and/or file transfer request) corresponding to the user request. At step 222, natural language processing application 124c may identify the mandatory parameters associated with the identified system request required to perform the system request. At step 223, natural language processing application 124c may compare the mandatory parameters of the particular system request corresponding to the user request with information associated with the user stored in user profile module 124a to check whether any of the mandatory parameters can be pre-populated with pre-stored information corresponding to the user. For example, in regard to a data and/or file transfer request, natural language processing application 124c of auto identification and mapping computing platform 120 may identify mandatory parameters as being 'from account,' 'to account,' 'data and/or file for transfer,' and 'date of transfer.' For the mandatory parameters, natural language processing application 124c may determine whether user information stored in user profile 124a may be used to pre-populate one or more of the 'from account,' 'to account,' 'data and/or file for transfer,' and 'date of transfer.' At step 224, if pre-stored information in user profile 124a corresponding to the user is determined to be applicable, the pre-stored information may be pre-populated in the corresponding mandatory parameter.

Figure 2G:
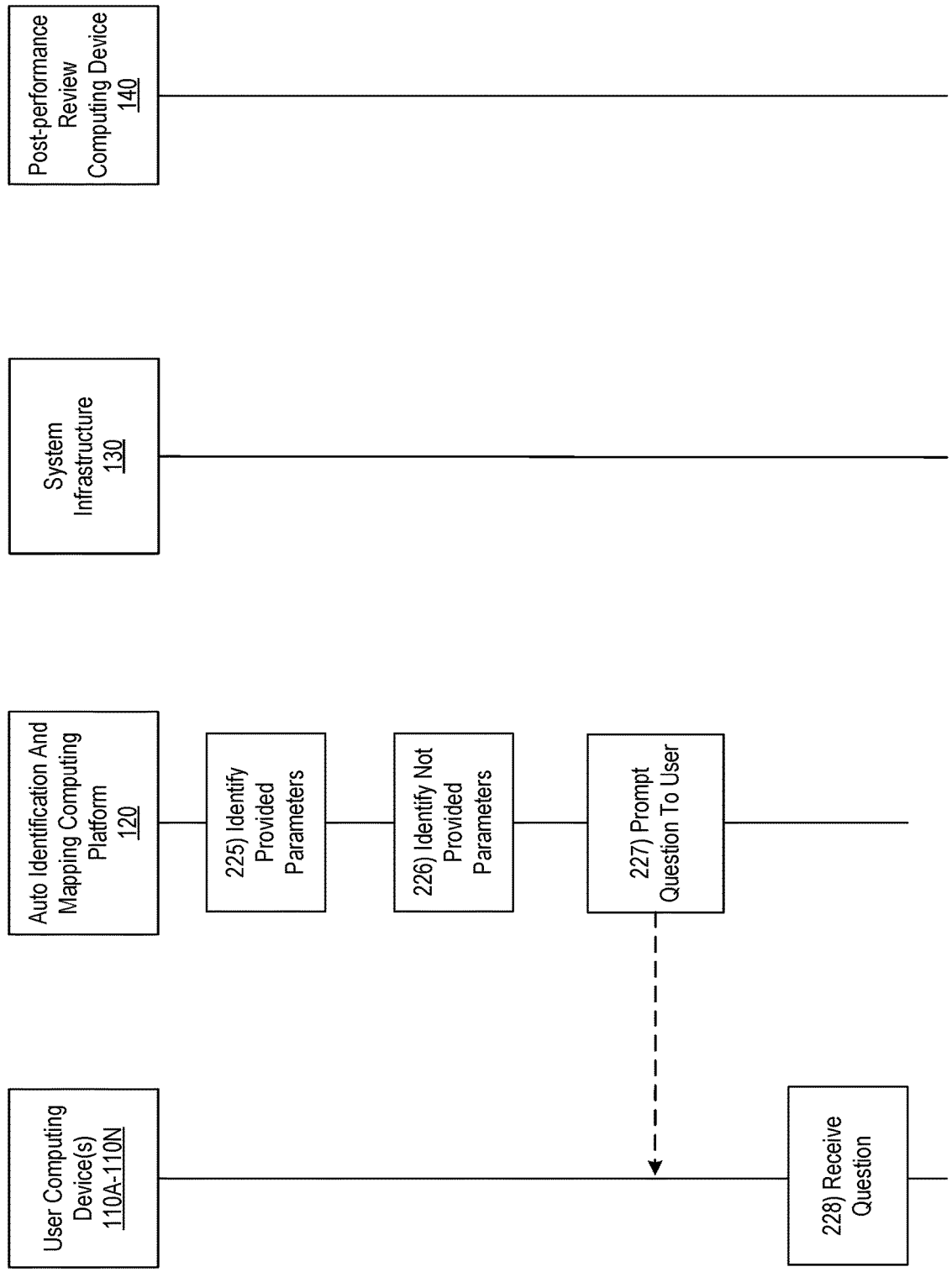

Referring to FIG. 2G at step 225, natural language processing application 124c of the auto identification and mapping computing platform 120 may identify parameters for which the user has provided information for in the audible input. At step 226, natural language processing application 124c may identify if there are any mandatory parameters for which the user has not provided the required information. If so, natural language processing application 124c, based on the priority ranking for each of the input parameters, may audibly prompt the user with the question corresponding to the input parameter by transmitting the question to the user computing device from 110A-110N corresponding to the user at step 227. In some instances, the question provided to the user may be the question with the highest efficacy rating corresponding to the input parameter. Conversely, if all the mandatory parameters have been provided by the user, then the user request may be executed at step 233. At step 228, the user computing device 110A-110N associated with the user may receive the question.

Figure 2H:
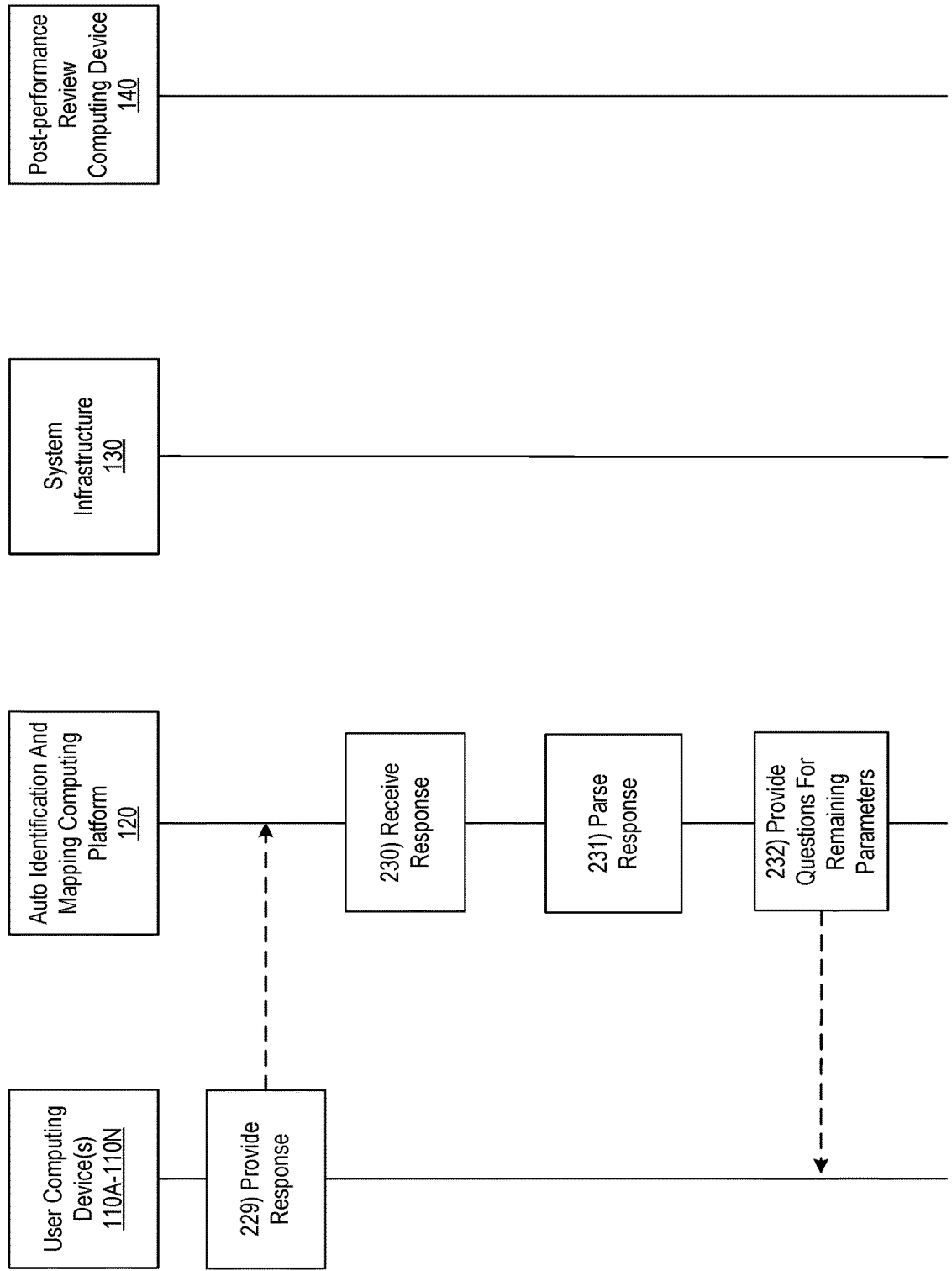

Referring to FIG. 2H, at step 229, the user of the user computing device 110A-110N may provide a response to the question provided by auto identification and mapping computing platform 120 and at step 230, auto identification and mapping computing platform 120 may receive the response. At step 231, natural language processing application 124c may parse the user response to produce a POS tagged sentence for the response. In some instances, the parsed response provided by the user at step 229 may indicate that the user did not hear and/or understand the question. If so, then natural language processing application 124c of auto identification and mapping computing platform 120 may provide the question again user. However, in the second response to the question, if the user again indicates that the question was not heard and/or understood, then natural language processing application 124c may proceed with asking the question with the next highest efficacy rating from the questions associated with the particular parameter. In some instances, the change to asking the question with the next highest efficacy rating may occur after the third response or greater from the user in which the user indicates that the question was not heard and/or understood.

Alternatively, if the response provided includes information corresponding to the mandatory parameter associated with the question prompted to the user at step 227, then natural language processing application may proceed with providing questions to user for any remaining mandatory input parameters at step 232. The prompting of questions regarding the remaining questions may be similar to the process outline above.

Figure 2I:
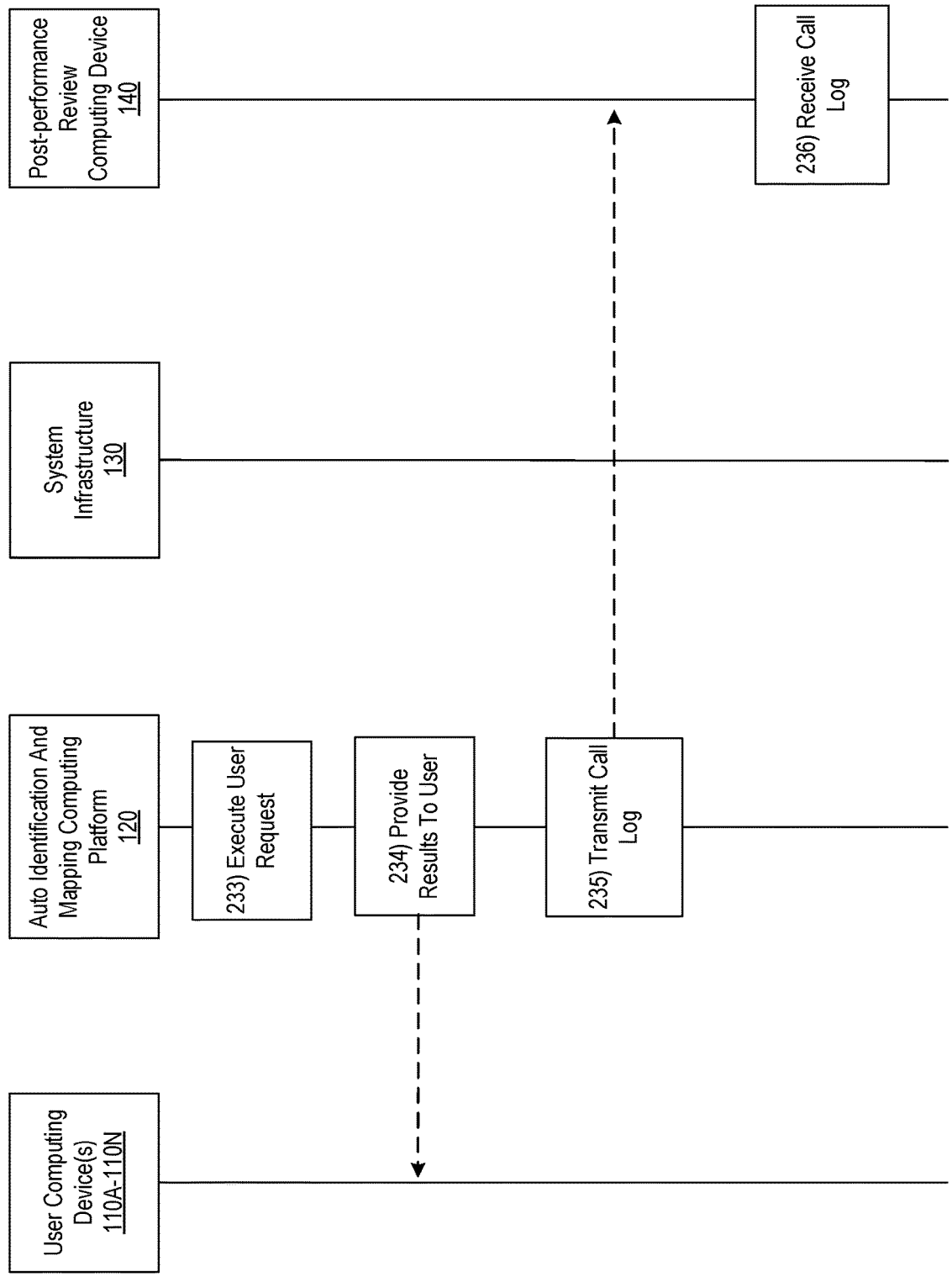

Referring to FIG. 2I, at step 233, after responses to all the mandatory input parameters have been provided, auto identification and mapping computing platform 120 may execute the user request. In doing so, auto identification and mapping computing platform 120 may perform the computational functions associated with the user request. At step 234, auto identification and mapping computing platform may transmit the results and/or confirmation corresponding to the executed user request to user computing device from 110A-110N associated with the user.

At step 235, auto identification and mapping computing platform 120 may transmit the call log corresponding to the user request to post-performance review computing device 140, which may receive the call log at step 236. A system administrator may be able to review the call log with respect to the information related to the generation of the plurality of questions and/or the elicitation of the required parameters via the plurality of questions performed by natural language processing and/or machine learning algorithms and provide feedback. Such feedback may be utilized to update the natural language processing and/or machine learning algorithms and improve performance.

Figure 2J:
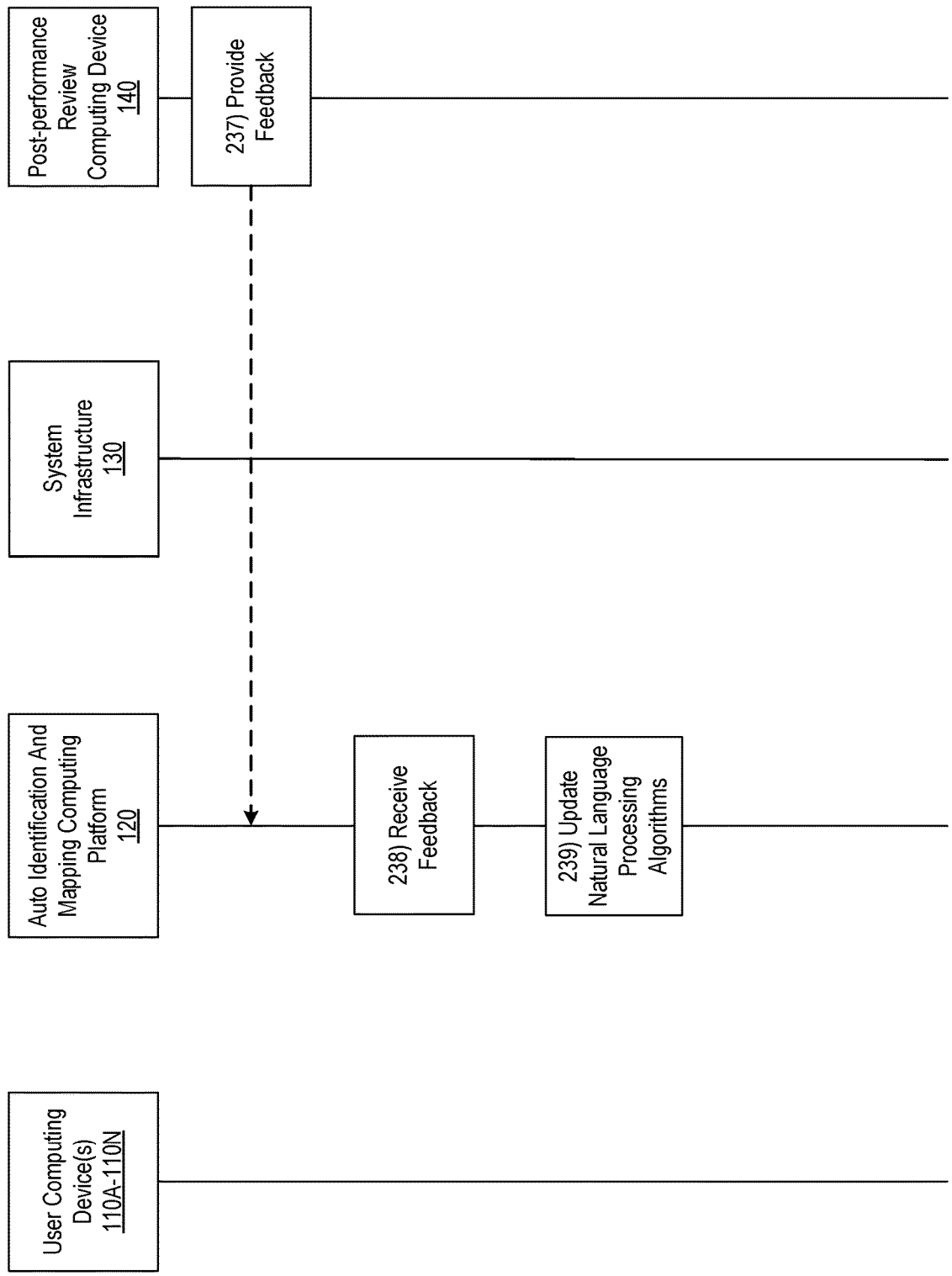

Referring to FIG. 2J, the system administrator of post-performance review computing device 140 may transmit the feedback to auto identification and mapping computing platform 120 at step 237. Auto identification and mapping computing platform 120 may receive the feedback at step 238 and may update natural language processing application 124c and machine learning module 124g at step 239.

Figure 3:
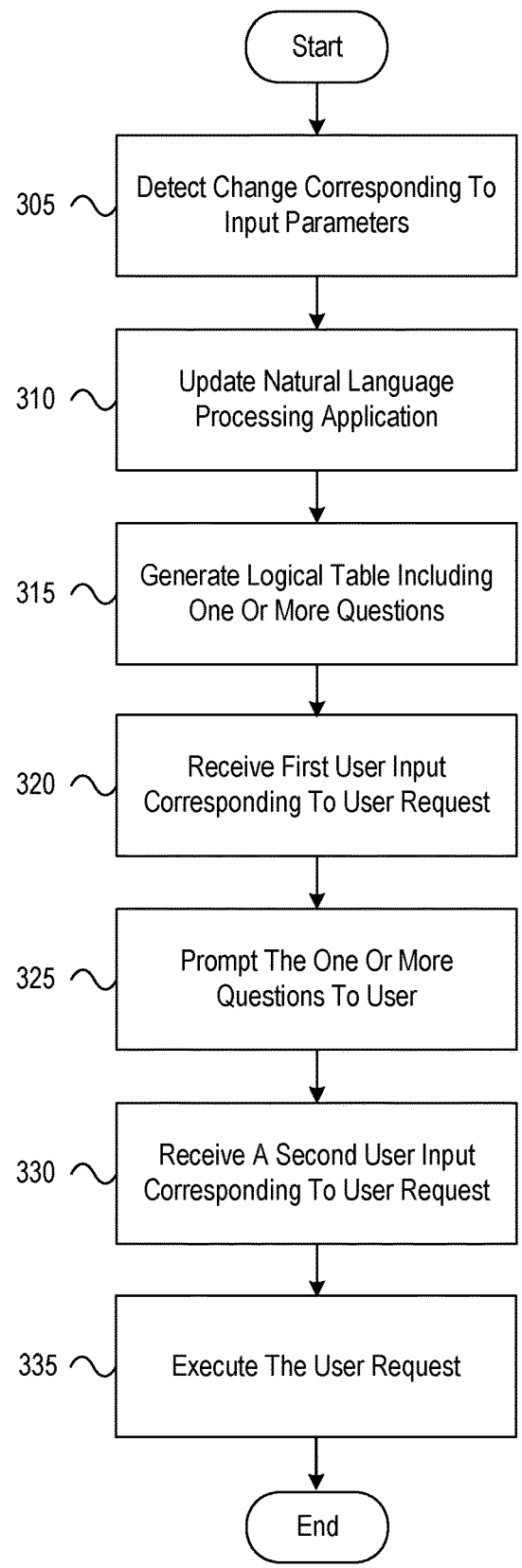
FIG. 3 depicts an illustrative method for auto identification and mapping of functional attributes from a visual representation in accordance with one or more example embodiments.

FIG. 3 illustrates an example method for auto identification and mapping of functional attributes from a visual representation in accordance with one or more example embodiments. Referring to FIG. 3, at step 305, a computing platform having at least one processor, one or more databases storing historical conversation logs, and memory, may detect a change corresponding to input parameters for performing a user request through a first representation of a webpage. At step 310, the computing platform may update, based on the detected change corresponding to the input parameters, a natural language processing application associated with a second representation of the webpage. At step 315, the computing platform may generate, based on the updated natural language processing application associated with the second representation of the webpage, a logical table including one or more questions to ask a user through the second representation of the webpage in response to one or more user inputs. At step 320, the computing platform may receive, through the second representation of the webpage, a first user input corresponding to the user request. At step 325, the computing platform, responsive to receiving the first user input, may prompt the user with the one or more questions regarding the input parameters for the user request. At step 330, the computing platform, responsive to prompting the user with the one or more questions, may receive at least a second user input including the one or more answers for the input parameters. At step 335, in response to receiving at least the second input including the one or more answers, the computing platform may execute the user request with the one or more answers for the input parameters.

The various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing platform, comprising:
   at least one processor;
   memory storing computer-readable instructions that, when executed by the at least one processor, cause the computing platform to:
   detect a change corresponding to input parameters for a first type of input for performing a user request through a first representation of a webpage, detecting the change corresponding to input parameters including identifying metadata for the input parameters;
   parse a page document corresponding to the first representation of the webpage to generate a document object model (DOM) of the page document including one or more tag sequences;
   isolate each of the one or more tag sequences related to user input fields for performing the user request;
   extract, from each of the one or more isolated tag sequences, information corresponding to the input parameters and associated attributes of each of the user input fields; and
   based on the extracted information, assign each of the input parameters as either mandatory or optional;
   update, based on the detected change corresponding to the input parameters and assessment of the metadata for the input parameters, a natural language processing application associated with a second representation of the webpage, updating the natural language processing application including updating input parameters associated with a second type of input different from the first type of input;
   generate, based on the updated natural language processing application associated with the second representation of the webpage, a logical table including one or more questions for prompting a user to provide one or more answers for the input parameters through the second representation of the webpage;
   receive, through the second representation of the webpage, a first user input corresponding to the user request;
   responsive to receiving the first user input, prompt the user with the one or more questions regarding the input parameters for the user request;
   responsive to prompting the user with the one or more questions, receive at least a second user input including the one or more answers for the input parameters; and
   in response to receiving at least the second user input including the one or more answers, execute the user request with the one or more answers for the input parameters.

2. The computing platform of claim 1, wherein the computer-readable instructions, when executed by the at least one processor, further cause the computing platform to:
   retrieve historical conversation logs from one or more databases stored on the computing platform;
   isolate the historical conversation logs corresponding to the user request;
   parse the isolated historical conversation logs corresponding to the user request to produce a part-of-speech (POS) tagged sentence for each of the historical conversation logs;
   generate a mapping of the input parameters and associated attributes with the POS tagged sentence for each of the historical conversation logs;
   build, based on the mapping, a confidence association of the input parameters and associated attributes with the POS tagged sentence for each of the historical conversation logs; and
   update, based on the mapping and the confidence association, the natural language processing application associated with the second representation of the webpage.

3. The computing platform of claim 2, wherein the computer-readable instructions, when executed by the at least one processor, further cause the computing platform to:
   identify, based on the mapping of the input parameters and associated attributes with the POS tagged sentence for each of the historical conversation logs, a particular question of the one or more questions for each of the input parameters corresponding to the user request;
   determine a priority ranking for each of the input parameters corresponding to the user request based on an average position of the input parameters in the POS tagged sentence in each of the historical conversation logs; and order the one or more questions based on the priority ranking for each of the input parameters.

4. The computing platform of claim 3, wherein the computer-readable instructions, when executed by the at least one processor, further cause the computing platform to:
   parse the first user input to produce a POS tagged sentence for the first user input; and
   identify, based on the POS tagged sentence for the first user input, input parameters for which the user has provided information.

5. The computing platform of claim 4, wherein the computer-readable instructions, when executed by the at least one processor, further cause the computing platform to:
   determine the input parameters for which the user has not provided information
   identify the priority ranking for each of the input parameters for which the user has not provided information;
   based on the priority ranking for each of the input parameters, prompt the user to provide the second user input by presenting a question corresponding to the input parameter having a highest priority ranking; and
   receive, through the second representation of the webpage, the second user input.

6. The computing platform of claim 5, wherein the computer-readable instructions, when executed by the at least one processor, further cause the computing platform to:

identify that the user has provided information for each of the input parameters corresponding to the user request; and in response to identifying that the user has provided information for each of the input parameters corresponding to the user request, perform the user request.

7. A method, comprising:

at a computing platform comprising at least one processor, and memory:

detecting a change corresponding to input parameters for a first type of input for performing a user request through a first representation of a webpage, detecting the change corresponding to input parameters including identifying metadata for the input parameters;

parsing a page document corresponding to the first representation of the webpage to generate a document object model (DOM) of the page document including one or more tag sequences;

isolating each of the one or more tag sequences related to user input fields for performing the user request;

extracting, from each of the one or more isolated tag sequences, information corresponding to the input parameters and associated attributes of each of the user input fields; and based on the extracted information, assigning each of the input parameters as either mandatory or optional;

updating, based on the detected change corresponding to the input parameters and assessment of the metadata for the input parameters, a natural language processing application associated with a second representation of the webpage, updating the natural language processing application including updating input parameters associated with a second type of input different from the first type of input;

generating, based on the updated natural language processing application associated with the second representation of the webpage, a logical table including one or more questions for prompting a user to provide one or more answers for the input parameters through the second representation of the webpage;

receiving, through the second representation of the webpage, a first user input corresponding to the user request;

responsive to receiving the first user input, prompting the user with the one or more questions regarding the input parameters for the user request;

responsive to prompting the user with the one or more questions, receiving at least a second user input including the one or more answers for the input parameters; and in response to receiving at least the second user input including the one or more answers, executing the user request with the one or more answers for the input parameters.

8. The method of claim 7, further comprising:

retrieve historical conversation logs from one or more databases stored on the computing platform;

isolating the historical conversation logs corresponding to the user request;

parsing the isolated historical conversation logs corresponding to the user request to produce a part-of-speech (POS) tagged sentence for each of the historical conversation logs;

generating a mapping of the input parameters and associated attributes with the POS tagged sentence for each of the historical conversation logs;

building, based on the mapping, a confidence association of the input parameters and associated attributes with the POS tagged sentence for each of the historical conversation logs; and updating, based on the mapping and the confidence association, the natural language processing application associated with the second representation of the webpage.

9. The method of claim 8, further comprising:

identifying, based on the mapping of the input parameters and associated attributes with the POS tagged sentence for each of the historical conversation logs, a particular question of the one or more questions for each of the input parameters corresponding to the user request;

determining a priority ranking for each of the input parameters corresponding to the user request based on an average position of the input parameters in the POS tagged sentence in each of the historical conversation logs; and ordering the one or more questions based on the priority ranking for each of the input parameters.

10. The method of claim 9, further comprising:

parsing the first user input to produce a POS tagged sentence for the first user input; and identifying, based on the POS tagged sentence for the first user input, input parameters for which the user has provided information.

11. The method of claim 10, further comprising:

determining the input parameters for which the user has not provided information;

identifying the priority ranking for each of the input parameters for which the user has not provided information;

based on the priority ranking for each of the input parameters, prompting the user to provide the second user input by presenting a question corresponding to the input parameter having a highest priority ranking; and receiving, through the second representation of the webpage, the second user input.

12. The method of claim 11, further comprising:

identifying that the user has provided information for each of the input parameters corresponding to the user request; and in response to identifying that the user has provided information for each of the input parameters corresponding to the user request, performing the user request.

13. One or more non-transitory computer-readable media storing instructions that, when executed by a computing platform comprising at least one processor, and memory, cause the computing platform to:

detect a change corresponding to input parameters for a first type of input for performing a user request through a first representation of a webpage, detecting the change corresponding to input parameters including identifying metadata for the input parameters;

parse a page document corresponding to the first representation of the webpage to generate a document object model (DOM) of the page document including one or more tag sequences;

isolate each of the one or more tag sequences related to user input fields for performing the user request;

extract, from each of the one or more isolated tag sequences, information corresponding to the input parameters and associated attributes of each of the user input fields;

based on the extracted information, assign each of the input parameters as either mandatory or optional;

update, based on the detected change corresponding to the input parameters and assessment of the metadata for the input parameters, a natural language processing application associated with a second representation of the webpage, updating the natural language processing application including updating input parameters associated with a second type of input different from the first type of input;

generate, based on the updated natural language processing application associated with the second representation of the webpage, a logical table including one or more questions for prompting a user to provide one or more answers for the input parameters through the second representation of the webpage;

receive, through the second representation of the webpage, a first user input corresponding to the user request;

responsive to receiving the first user input, prompt the user with the one or more questions regarding the input parameters for the user request;

responsive to prompting the user with the one or more questions, receive at least a second user input including the one or more answers for the input parameters; and in response to receiving at least the second user input including the one or more answers, execute the user request with the one or more answers for the input parameters.

14. The one or more non-transitory computer-readable media of claim 13, storing additional instructions that, when executed by the computing platform, cause the computing platform to:

retrieve historical conversation logs from one or more databases stored on the computing platform;

isolate the historical conversation logs corresponding to the user request;

parse the isolated historical conversation logs corresponding to the user request to produce a part-of-speech (POS) tagged sentence for each of the historical conversation logs;

generate a mapping of the input parameters and associated attributes with the POS tagged sentence for each of the historical conversation logs;

build, based on the mapping, a confidence association of the input parameters and associated attributes with the POS tagged sentence for each of the historical conversation logs; and update, based on the mapping and the confidence association, the natural language processing application associated with the second representation of the webpage.

15. The one or more non-transitory computer-readable media of claim 14, storing additional instructions that, when executed by the computing platform, cause the computing platform to:

identify, based on the mapping of the input parameters and associated attributes with the POS tagged sentence for each of the historical conversation logs, a particular question of the one or more questions for each of the input parameters corresponding to the user request;

determine a priority ranking for each of the input parameters corresponding to the user request based on an average position of the input parameters in the POS tagged sentence in each of the historical conversation logs; and order the one or more questions based on the priority ranking for each of the input parameters.

16. The one or more non-transitory computer-readable media of claim 15, storing additional instructions that, when executed by the computing platform, cause the computing platform to:

parse the first user input to produce a POS tagged sentence for the first user input; and identify, based on the POS tagged sentence for the first user input, input parameters for which the user has provided information.

17. The one or more non-transitory computer-readable media of claim 16, storing additional instructions that, when executed by the computing platform, cause the computing platform to:

determine the input parameters for which the user has not provided information;

identify the priority ranking for each of the input parameters for which the user has not provided information;

based on the priority ranking for each of the input parameters, prompt the user to provide the second user input by presenting a question corresponding to the input parameter having a highest priority ranking;

receive, through the second representation of the webpage, the second user input;

identify that the user has provided information for each of the input parameters corresponding to the user request; and in response to identifying that the user has provided information for each of the input parameters corresponding to the user request, perform the user request.

* * * * *